(12) United States Patent
Su

(10) Patent No.: US 6,425,674 B1
(45) Date of Patent: Jul. 30, 2002

(54) BACK LIGHTING PLATE

(75) Inventor: Michael Su, Chungho (TW)

(73) Assignee: Opto-Prolite Electronic Co., Ltd., Taipei Hsieng (TW)

( * ) Notice: Subject to any disclaimer, the term of this patent is extended or adjusted under 35 U.S.C. 154(b) by 2 days.

(21) Appl. No.: 09/756,728

(22) Filed: Jan. 10, 2001

(51) Int. Cl.⁷ ................................................. F21V 8/00
(52) U.S. Cl. ........................................... 362/31; 362/84
(58) Field of Search ............................. 362/31, 582, 84

(56) References Cited

U.S. PATENT DOCUMENTS 4,779,166 A * 10/1988 Tanaka et al. ................. 362/31
6,332,690 B1 * 12/2001 Murofushi .................... 362/84

* cited by examiner

Primary Examiner—Laura K. Tso
(74) Attorney, Agent, or Firm—Rosenberg, Klein & Lee

(57) ABSTRACT

The present invention provides a back lighting plate, which is distributed with reflecting grains uniformly at inside, and has a bottom fluorescent reflecting coating and (or) an atomised top surface. Apply this optical conducting plate having many reflecting grains at inside to replace the conventional sticking diffusion film to get good reflection environment so that the light ray can be fully reflected and absorbed by the bottom fluorescent reflecting coating so as to meet the expected colour and evenness degree.

2 Claims, 2 Drawing Sheets

BACK LIGHTING PLATE

BACKGROUND OF THE INVENTION

1. Field of the Invention

The present invention relates to a back lighting plate.

2. Description of Prior Art

As shown on FIG. 3, a conventional variable-wavelength back lighting plate in that the light emitting diodes 83 are coated on phosphide compounded fluorescent material 84 on the outside surface directly so as to change the wavelength, in order to give out the desired colour can be saw by human eyes. But during a long-term working in a high temperature the phosphide may be failed so that the wavelength restores to the original state.

For innovating on above-mentioned product, the products in the market so far, as shown on FIG. 4, are designed into a new structure, in which a diffusion film coated with the fluorescent material 84 is covered on the top is surface of the back lighting plate instead of coating the phosphide on directly, so that when the light passing through the fluorescent material from front side, the wavelength (the colour of the light) is changed, thereby the diminution problem of the fluorescent material is solved, but in the manufacturing, the rate of producing pin-hole is increased so that the production cost is not decreased to a proper level.

For spreading the luminosity on surface of the back lighting plate 8 in uniform distribution (referring to FIG. 3 and FIG. 4), the top surface of the back lighting plate 8 is covered a diffusion film 81, so that the light source is reflected by the reflection paper 82 laid on the bottom side, then is diffused to the outside uniformly by the diffusion film 81. But in manufacturing, this procedure takes much time so that the production cost goes up virtually. So the cost of the conventional product includes the costs of a back plate, a reflection paper and a diffusion film attached with fluorescent material, and the cost of processes.

OBJECTS AND SUMMARY OF THE INVENTION

It is therefore a main object of the present invention to provide a back lighting plate, in which the procedure of gluing the diffusion film and the cost are saved meanwhile guarantee the light intensity and the colour spread on the surface uniformly.

A back lighting plate, which contains many reflecting fine grains at inside uniformly and a fluorescent reflection coating at the bottom, achieves this object.

Above-mentioned back lighting plate has an atomised top surface.

In accordance with this structure, the back lighting plate containing the reflecting grains replaces the conventional diffusion film to supply a good reflecting diffusion environment and make the light be reflected and absorbed fully by the fluorescent reflecting coating so as to meet the expected colour and evenness degree. Meanwhile the atomised top surface inflects the light again as passing through to improve the uniform light effect.

DETAILED DESCRIPTION OF PREFERRED EMBODIMENTS

Figure 1:
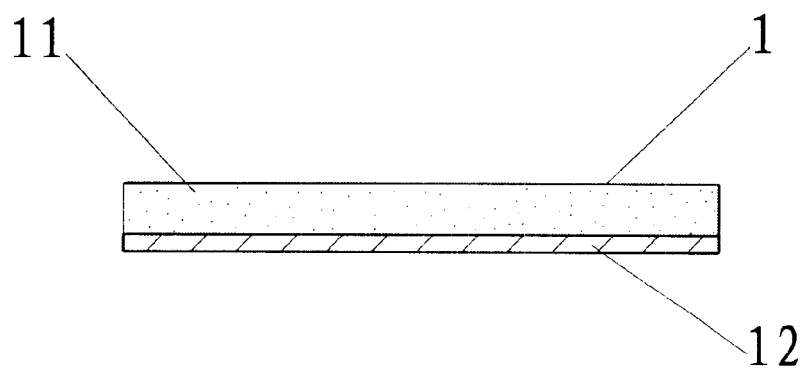
FIG. 1 is a cross-section view showing the structure of the back lighting plate and the fluorescent reflection coating of the present invention.
Figure 2:
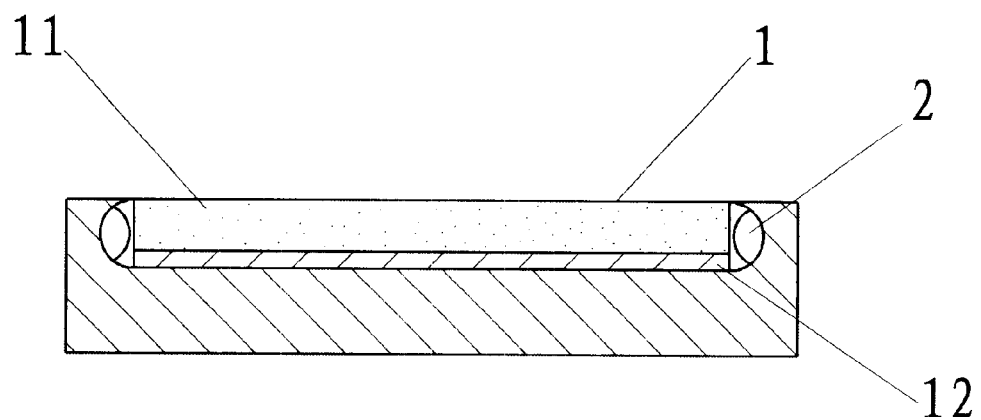
FIG. 2 is a cross-section view in operation of the present invention.
Figure 3:
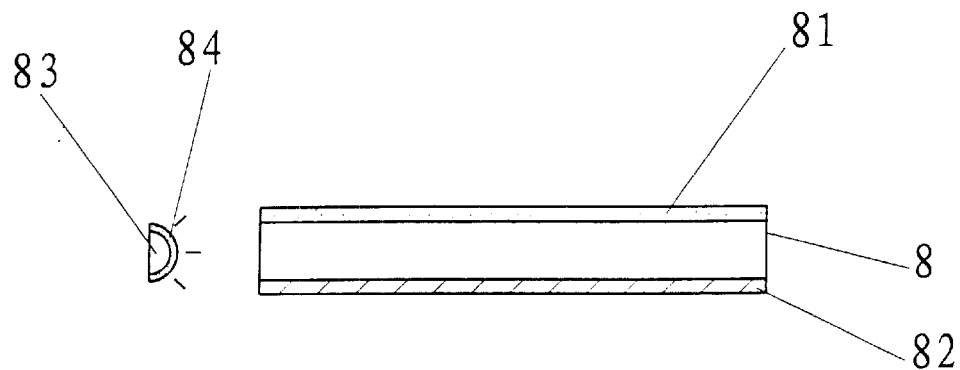
FIG. 3 is a cross-section view of the prior art.
Figure 4:
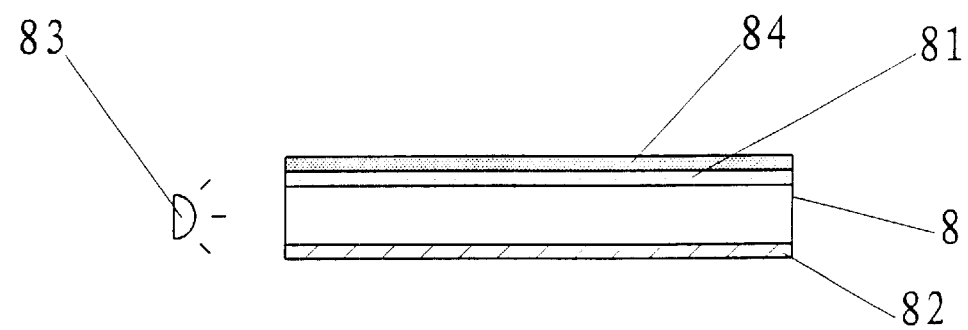
FIG. 4 is a cross-section view of another prior art.

Referring to FIG. 1 and FIG. 2, the present invention provides an optical conducting plate 1 that is pre-mixed with additive powder having reflecting function (as like ore powder) before moulded, so that the many reflecting grains 11 uniformly fill in the inside as it is shaped, and is attached with a fluorescent reflecting coating 12 on the bottom surface.

When the light ray 2 passes through the optical conducting plate 1, the reflecting grains 11 at the inside provide full-angle and full-position reflection environment so that it can be fully reflected and absorbed by the bottom fluorescent reflecting coating 12 to get the desired light colour and evenness degree.

As moulding, the top surface of the optical conducting plate 1 is atomised, in order to improve the times of reflection and light evenness

I claim:

1. A back lighting plate, wherein, the inside of the optical conducting plate is distributed with reflecting grains uniformly, and has a bottom fluorescent reflecting coating.

2. A back lighting plate as claimed in claim 1, wherein, the top surface of the optical conducting plate is processed in atomisation treat.

* * * * *